United States Patent
Dib

(10) Patent No.: US 10,329,944 B2
(45) Date of Patent: Jun. 25, 2019

(54) DRAIN FOR A PRESSURE SENSING LINE

(71) Applicant: ROLLS-ROYCE plc, London (GB)

(72) Inventor: Maitham Dib, Derby (GB)

(73) Assignee: ROLLS-ROYCE plc, London (GB)

(*) Notice: Subject to any disclaimer, the term of this patent is extended or adjusted under 35 U.S.C. 154(b) by 456 days.

(21) Appl. No.: 15/135,198

(22) Filed: Apr. 21, 2016

(65) Prior Publication Data

US 2016/0333724 A1 Nov. 17, 2016

(30) Foreign Application Priority Data

May 14, 2015 (GB) .................................. 1508220.9

(51) Int. Cl.
| | |
|---|---|
| *F01D 25/32* | (2006.01) |
| *F01D 17/08* | (2006.01) |
| *F15C 1/16* | (2006.01) |
| *F15D 1/00* | (2006.01) |
| *G01L 19/06* | (2006.01) |

(52) U.S. Cl.
CPC ............. *F01D 17/08* (2013.01); *F01D 25/32* (2013.01); *F15C 1/16* (2013.01); *F15D 1/0015* (2013.01); *G01L 19/0654* (2013.01)

(58) Field of Classification Search
USPC .................................................. 137/808, 810
See application file for complete search history.

(56) References Cited

U.S. PATENT DOCUMENTS

| | | | | |
|---|---|---|---|---|
| 3,207,168 | A | * | 9/1965 | Warren ..................... F15C 1/02 |
| | | | | 137/809 |
| 3,272,213 | A | * | 9/1966 | Jones ........................ F15B 5/00 |
| | | | | 137/810 |
| 3,513,865 | A | * | 5/1970 | Van Der Heyden ...... F15C 1/16 |
| | | | | 137/813 |
| 3,911,858 | A | * | 10/1975 | Goodwin .................. B05B 1/08 |
| | | | | 116/137 A |

(Continued)

FOREIGN PATENT DOCUMENTS

| | | |
|---|---|---|
| EP | 2851569 A1 | 3/2015 |
| GB | 2391959 A | 2/2004 |

(Continued)

OTHER PUBLICATIONS

Oct. 17, 2016 Search Report issued in European Patent Application No. 16166185.

(Continued)

*Primary Examiner* — Jason D Shanske
*Assistant Examiner* — Theodore C Ribadeneyra
(74) *Attorney, Agent, or Firm* — Oliff PLC

(57) ABSTRACT

A drain includes a vortex throttle, to remove water from a pressure sensing line. The vortex throttle resists the flow of air through it. Therefore, for a given diameter of inlet and outlet ports the mass flow rate through the vortex throttle is much smaller than through a plain hole of the same diameter. The inlet and outlet ports may therefore be made larger than in known arrangements (so reducing the risk of blockage), but the operation of the vortex throttle restricts the mass flow (Continued)

of air through the drain pipe (so minimizing the detrimental effects on the engine's operation). Collected water effectively drains from the pressure sensing line, without the disadvantages of known arrangements.

12 Claims, 4 Drawing Sheets

(56) References Cited

U.S. PATENT DOCUMENTS

| | | | | |
|---|---|---|---|---|
| 4,131,134 A * | 12/1978 | Lindberg | ............... | F15C 1/16 137/808 |
| 4,447,190 A * | 5/1984 | Campbell | ............... | F01D 5/08 415/110 |
| 4,449,862 A * | 5/1984 | Beck | ............... | B01F 5/0057 37/195 |
| 4,684,296 A * | 8/1987 | Horii | ............... | B65G 53/42 137/1 |
| 4,721,126 A * | 1/1988 | Horii | ............... | B65G 53/58 137/1 |
| 4,762,148 A * | 8/1988 | Marui | ............... | B65G 53/526 137/808 |
| 5,303,782 A * | 4/1994 | Johannessen | ............... | E03F 5/106 137/809 |
| 5,651,466 A * | 7/1997 | Satomi | ............... | B04C 5/02 209/734 |
| 6,283,626 B1 * | 9/2001 | Lim | ............... | B01F 5/0057 366/108 |
| 7,384,439 B2 * | 6/2008 | Broughton | ............... | B01D 45/16 55/345 |
| 9,128,071 B2 * | 9/2015 | Tsukada | ............... | G01N 30/34 |
| 2003/0051553 A1 * | 3/2003 | Matsuyama | ............... | F01D 17/08 73/708 |
| 2003/0102038 A1 * | 6/2003 | Lane | ............... | B65G 53/521 137/808 |
| 2010/0300568 A1 * | 12/2010 | Faram | ............... | E03F 5/106 137/810 |
| 2013/0327727 A1 * | 12/2013 | Hopper | ............... | B01D 17/0217 210/787 |
| 2015/0268667 A1 * | 9/2015 | Jarman | ............... | E03F 5/106 137/10 |

FOREIGN PATENT DOCUMENTS

| | | |
|---|---|---|
| GB | 2429936 A | 3/2007 |
| WO | 2005/017465 A2 | 2/2005 |

OTHER PUBLICATIONS

Dec. 22, 2015 Search Report issued in British Patent Application No. 1508220.9.

* cited by examiner

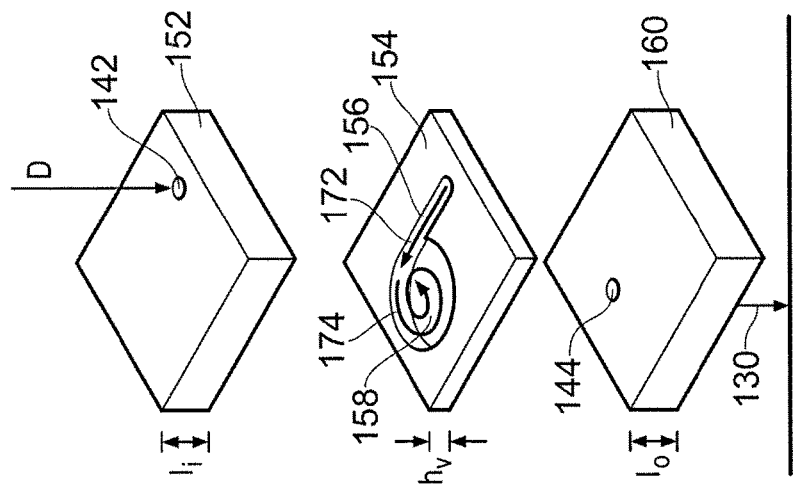
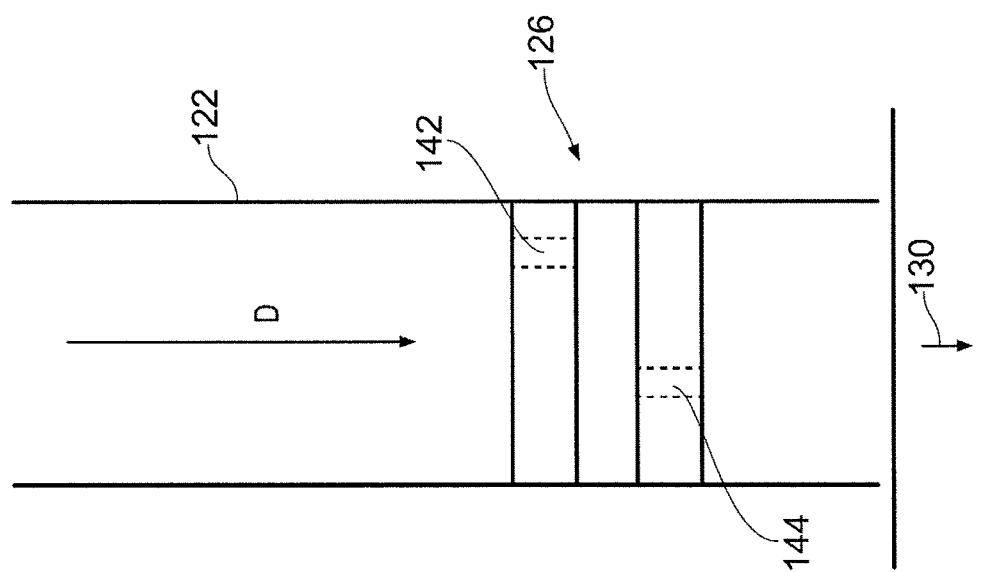

DRAIN FOR A PRESSURE SENSING LINE

This invention relates to pressure sensing lines, and in particular to drains for removing water from such lines.

In the operation of a gas turbine engine, it is important to monitor temperatures and pressures at different positions within the engine. However, because of constraints of space and access, it is not always possible to measure these parameters directly in the location where the measurement is to be made. It is therefore known to carry a signal away from the point of measurement for use elsewhere. For example, electrical wires may carry an electrical signal from a sensor to a remote measurement unit.

In the case of pressure measurement, this is achieved by carrying the pressurised air through a pipe or tube, known as a pressure sensing line. An example of this is the P30 (high pressure compressor (HPC) exit) pressure, which is carried to the electronic engine controller (EEC) where it is used to control the engine. Typically, a P30 sensing line comprises tubing (which may be of varying diameter) routed from the combustion outer casing (at the HPC exit) to the EEC, where the HP6 pressure (the pressure at the exit from the sixth stage of the HPC compressor) is measured by a high-accuracy pressure transducer.

A problem with pressure sensing lines is that water can collect within them. This is especially prevalent under engine acceleration, when hot moist air from the HP6 exit enters the pressure sensing line. As this air makes its way towards the EEC it cools and water condenses out of it; naturally this water collects at the lowest points of the pressure sensing line.

It is known to provide a simple drain hole at the lowest point of the pressure sensing line, so that condensed water can drain out. Another known solution is shown in FIG. 1, in which a pressure sensing line 10 is provided with an orifice 14. A vertically-oriented bucket or water trap 12 is provided below the orifice 14. In use, the pressurised air providing the pressure signal flows along the pressure sensing line 10 as shown by the arrows P. A proportion of the air flow P flows through the orifice 14, as shown by the arrow D, carrying with it any collected water. An exit hole 16 is provided in a side wall of the water trap 12, at a distance 18 above the bottom of the trap, through which the air can escape, as shown by the arrow E. If the water level should rise to the level of the exit hole 16, any excess water will overflow through the exit hole 16.

During cold cycles or at high altitude the water in the sensing line can freeze; typically at cruise conditions the ambient temperature is around −50° C. and the temperature within Zone 1 (where the P30 sensing line is located) will only be slightly higher. In the first known arrangement described above, water may freeze in the sensing line; in the second arrangement, collected water in the water trap may freeze and if sufficient water collects and freezes then it may 'back up' into the sensing line. If enough ice forms to form a blockage across the inner walls of the sensing line, then the EEC will read a constant pressure signal and will fail to register any changes in pressure on the HP6 side of the blockage.

Both of these known solutions have significant disadvantages, in particular in selecting a suitable size for the drain hole or the orifice 14. If the hole or orifice is too small, then it is prone to blockage by debris from the pressure sensing line, and it will no longer drain effectively. On the contrary, if the hole or orifice is made large enough for blockage to be avoided, the mass flow of air through the pressure sensing line will cause its temperature to increase, potentially causing a fire risk. The loss of air through the pressure sensing line causes a reduction in the efficiency of the engine, which is undesirable. Also, the larger the loss of air through the drain hole or orifice, the greater the deterioration in the pressure signal reaching the pressure transducer, which affects the engine control. Known solutions therefore provide a drain hole or orifice whose size is an unsatisfactory compromise between avoiding blockage and avoiding detrimental effects on the engine's operation.

It would therefore be desirable to have a drain that reduces or overcomes the disadvantages of known arrangements, which provides effective drainage while simultaneously avoiding the risk of blockage, avoiding undesirably high temperatures or mass flows, and avoiding detrimental effects on the engine's operation or efficiency.

According to a first aspect, there is provided a drain for a pressure sensing line as set out in the claims. According to second and third aspects, there is provided a pressure sensing line and a gas turbine engine incorporating such a drain.

Embodiments of the invention will now be described in more detail, with reference to the attached drawings, in which FIG. 1 is a schematic illustration of a known drain, as already described;

FIG. 3 is a schematic, cross-sectional view of part of the drain of FIG. 2;

FIG. 4 is a schematic, exploded view of the components of the vortex throttle of FIG. 3.

Like parts in the drawings are identified by like reference numbers.

Figure 1:
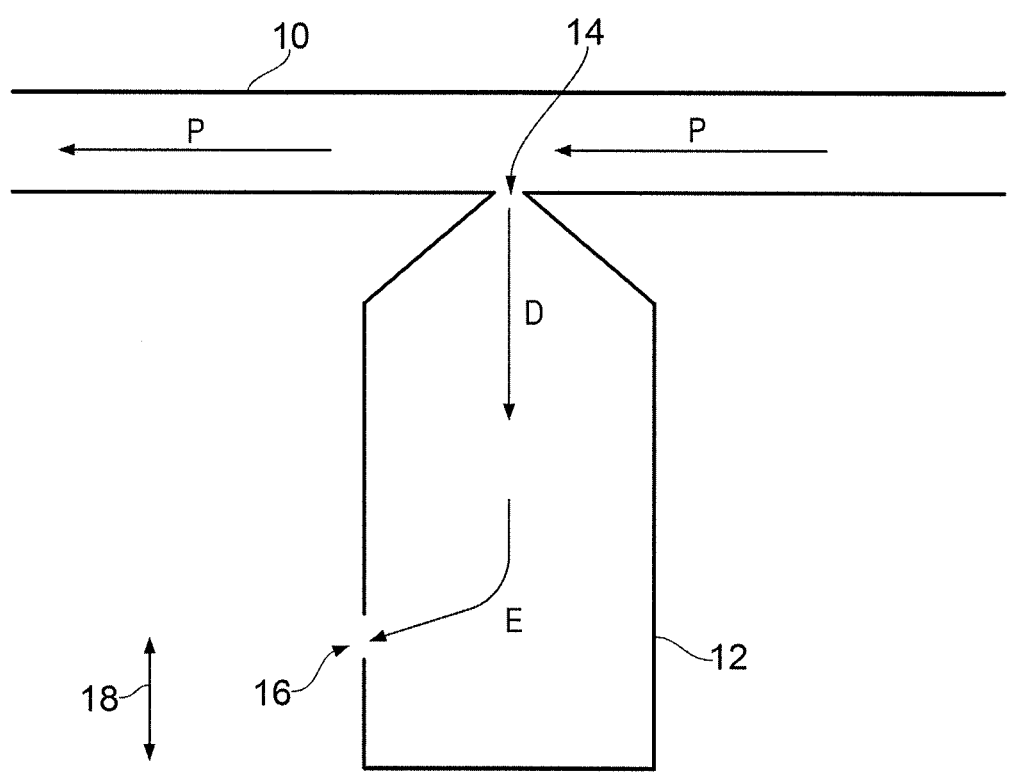
Figure 2:
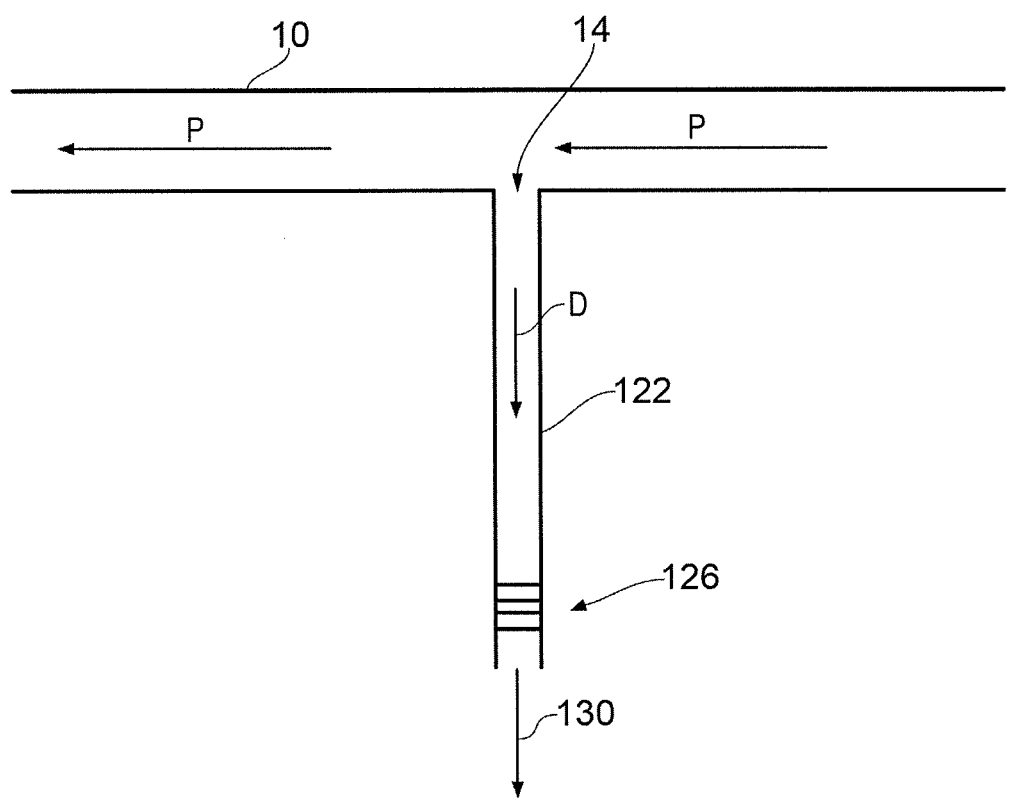
FIG. 2 is a schematic, cross-sectional view of a drain.

FIG. 2 shows a schematic, cross-sectional view of a drain in accordance with the invention. As in the embodiment of FIG. 1, a pressure sensing line 10 has an orifice 14. In use, the pressurised air providing the pressure signal flows along the pressure sensing line 10 as shown by the arrows P. A proportion of the air flow P flows through the orifice 14 into a drain pipe 122, as shown by the arrow D, carrying with it any collected water. Within the drain pipe 122 is a vortex throttle 126, whose construction and operation will be described in due course. The air flow D and water flow out of the end of the drain pipe 122 as shown by the arrow 130.

FIG. 3 shows in more detail the section of the drain pipe 122 containing the vortex throttle 126. The air flow D and water flow into the vortex throttle 126 through an inlet port 142 and flow out of the vortex throttle 126 through an outlet port 144. The air flow D and water then flow out of the end of the drain pipe 122 as shown by the arrow 130.

Figure 5:
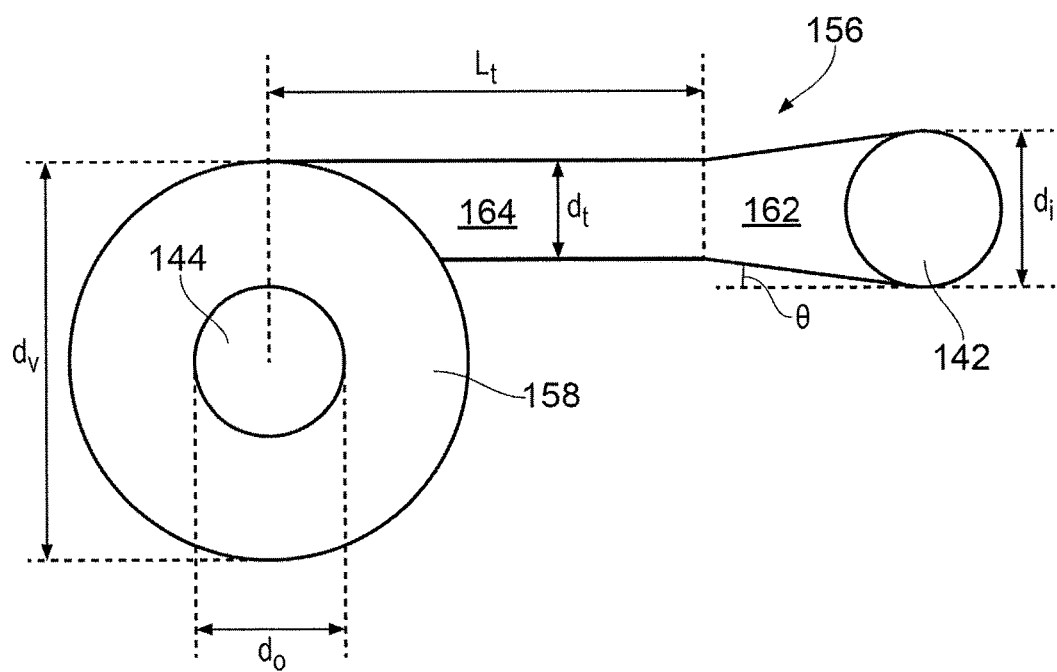
FIG. 5 is a schematic plan view of a vortex throttle.

FIG. 4 shows an exploded view of the vortex throttle 126. In this arrangement, the vortex throttle is constructed from three plates welded together, but it will be appreciated that in other embodiments different construction methods may be used, and that a vortex throttle suitable for use in the invention may be constructed from fewer or more than three plates, or may embody the essential features in a different manner entirely. FIG. 5 shows a schematic plan view of a vortex throttle, identifying certain elements and dimensions.

Vortex throttles are known in other technical fields, where they are sometimes referred to as vortex diodes or Zobel diodes.

Referring now to FIGS. 4 and 5, a first plate 152 comprises an inlet port 142 which has a diameter $d_i$. A second plate 154 comprises an inlet channel 156 which, when the vortex throttle is assembled, is in fluid communication with the inlet port 142. The inlet channel 156 leads tangentially into a vortex chamber 158 which has a diameter $d_v$. A third plate 160 comprises an outlet port 144 which has a diameter $d_o$. When the vortex throttle is assembled the outlet port 144 is concentric with the vortex chamber 158 and in fluid communication with it.

The inlet channel 156 comprises a flare 162, with a flare angle θ, and a throat 164 with a diameter $d_t$ and a length $I_t$. As may be seen from FIG. 4, the inlet port 142 has a length $I_i$, the outlet port 144 has a length $I_o$, and the vortex chamber 158 has a vertical height $h_v$. The vertical height $h_v$ of the vortex chamber 158 has been found to affect the performance losses, and accordingly $h_v$ is selected to minimise these losses. The throat 164 diameter $d_t$ has been found to affect the functionality of the vortex throttle, with the functionality increasing with decreasing $d_t$; this dimension is therefore selected to be as small as practicably possible.

In use, the air flow D flows into the vortex throttle 126 through the inlet port 142. It then flows through the inlet channel 156, as shown by the arrow 172, and into the vortex chamber 158. Within the vortex chamber 158, it is forced by the shape of the chamber and the position of the exit port 144 to form a vortex, following an inwardly spiralling path as shown by the arrow 174 to reach the exit port 144. The air flow then flows out of the vortex throttle 126 through the exit port 144, as shown by the arrow 130. The formation of the vortex causes the vortex throttle 126 to resist the flow of air through it, so that there is a substantial pressure drop across it. Therefore, for a given diameter of inlet and outlet ports $d_i$, $d_o$, the mass flow rate through the vortex throttle is much smaller than through a plain hole of the same diameter.

The inlet and outlet ports may therefore be made larger than in known arrangements (so reducing the risk of blockage), but the operation of the vortex throttle restricts the mass flow of air through the drain pipe 122 (so minimising the detrimental effects on the engine's operation). The invention thus provides effective drainage of collected water from the pressure sensing line, without the disadvantages of known arrangements.

The exact dimensions of the vortex throttle may be varied according to the particular needs of the application. In one arrangement, the elements of the vortex throttle 126 have the following dimensions:

Inlet port diameter $d_i$ 1.6 mm, length $I_i$ 4.5 mm; throat diameter $d_t$ 1.1 mm; throat length $I_t$ 5.1 mm; vortex chamber diameter $d_v$ 5.6 mm, height $h_v$ 1.1 mm; outlet port diameter $d_o$ 1.1 mm, length $I_o$ 4.5 mm.

The flare angle θ has been found to have a relatively small effect on the operation of the vortex throttle. It has been found that both converging and straight inlets are able to meet the flow requirement; therefore, the flare angle is seen as a non-critical feature. The throat length $I_t$ is also seen as a non-critical feature of the vortex throttle. However, testing has shown that the performance of the vortex throttle is optimal when this dimension is minimised.

The inventor has recognised that the advantages of the invention may be achieved with a range of dimensions for the elements of the vortex throttle 126, some of which may be summarised in terms of the ratios between various dimensions.

In particular, the ratio of vortex chamber diameter $d_v$ to exit port diameter $d_o$ affects the performance of the vortex throttle and should be a minimum of 5:1. Ratios of 5:1 to 7.4:1 are thought to be particularly suitable.

The ratio of the vortex chamber diameter $d_v$ to inlet port diameter $d_i$ is not a critical feature of the invention and the design of the vortex throttle is defined by the ratio of vortex chamber diameter to exit port diameter as discussed above. The dimension $d_i$ is not thought to have a major effect on the operation of the drain. In a particular arrangement, the value for the dimension $d_i$ is at least 1.0 mm. Tests have been carried out on inlet ports with dimension $d_i$ between 1.0 mm and 2.0 mm.

In the arrangement shown in FIGS. 3 and 4, the vortex throttle is constructed from three plates which are welded together; before assembly and welding, the top plate is machined with the inlet port, the middle plate with the vortex chamber, and the bottom plate with the exit port. However, alternative methods of manufacture and assembly may be employed. For example, dowel pins may be used to improve confidence that the vortex throttle will be aligned correctly during assembly.

Any component or feature described in this disclosure may be combined with any other compatible component or feature. Furthermore, it will be appreciated that various alternative or complementary arrangements or components not explicitly described herein are in accordance with the disclosure.

The invention claimed is:

1. A drain for a pressure sensing line, the drain comprising:
   a vortex throttle that includes:
      a first plate including an inlet port having a first diameter;
      a second plate having an inlet channel and a vortex chamber;
      the inlet channel comprising:
         a flare that is in fluid communication with the inlet port; and
         a throat that leads into the vortex chamber, the throat having a consistent second diameter along an entire length of the throat, the flare being angled relative to the throat; and
      a third plate including an outlet port that is in fluid communication with the vortex chamber.

2. The drain of claim 1, wherein the inlet port diameter is between 1 mm and 2 mm.

3. The drain of claim 1, wherein the ratio of the outlet port diameter to the vortex chamber diameter is between 1:5 and 1:7.4.

4. The drain of claim 1, wherein the vortex chamber has a diameter of between 5 mm and 6 mm.

5. The drain of claim 1, wherein the inlet and outlet ports each have a diameter of between 1 mm and 2 mm.

6. The drain of claim 1, wherein the outlet port is arranged concentrically with the vortex chamber.

7. The drain of claim 1, wherein the second diameter of the throat is smaller than the first diameter of the inlet port.

8. The drain of claim 1, wherein the inlet port extends in a thickness direction of the first plate.

9. The drain of claim 1, wherein the outlet port extends in a thickness direction of the third plate.

10. A pressure sensing line, comprising the drain of claim 1.

11. A gas turbine engine, comprising the drain of claim 1.

12. A gas turbine engine comprising the pressure sensing line of claim 10.

* * * * *